US012598454B2

(12) United States Patent
Santhar et al.

(10) Patent No.: US 12,598,454 B2
(45) Date of Patent: Apr. 7, 2026

(54) DYNAMIC CONFIGURATION OF AN ELECTRONIC SUBSCRIBER IDENTIFICATION MODULE IN A VIRTUAL REALITY ENVIRONMENT

(71) Applicant: INTERNATIONAL BUSINESS MACHINES CORPORATION, Armonk, NY (US)

(72) Inventors: Sathya Santhar, Ramapuram (IN); Sarbajit K. Rakshit, Kolkata (IN); Sridevi Kannan, Chennai (IN); Samuel Mathew Jawaharlal, Chennai (IN)

( * ) Notice: Subject to any disclaimer, the term of this patent is extended or adjusted under 35 U.S.C. 154(b) by 618 days.

(21) Appl. No.: 18/047,125

(22) Filed: Oct. 17, 2022

(65) Prior Publication Data

US 2024/0129709 A1 Apr. 18, 2024

(51) Int. Cl.
*H04W 8/18* (2009.01)
*G06F 3/01* (2006.01)
*H04W 4/24* (2024.01)
*H04W 4/50* (2018.01)

(52) U.S. Cl.
CPC ............ *H04W 8/183* (2013.01); *G06F 3/013* (2013.01); *H04W 4/24* (2013.01); *H04W 4/50* (2018.02)

(58) Field of Classification Search
CPC ......... H04W 8/183; H04W 4/24; H04W 4/50; G06F 3/013
See application file for complete search history.

(56) References Cited

U.S. PATENT DOCUMENTS

| | | | |
|---|---|---|---|
| 10,897,690 B2 * | 1/2021 | Karimli | ................. H04M 15/48 |
| 11,284,271 B2 | 3/2022 | Gundavelli | |
| 2021/0240279 A1 * | 8/2021 | Harviainen | ............. G06F 3/017 |

FOREIGN PATENT DOCUMENTS

| | | |
|---|---|---|
| CN | 105979569 A | 9/2016 |
| WO | 2017156833 A1 | 9/2017 |

OTHER PUBLICATIONS

"ESIM FAQs—Two numbers on one phone", Verizon, 4 pp., [online][retrieved Oct. 17, 2022] https://www.verizon.com/support/dual-sim-with-esim-faqs/.
IoTNOW, "Who is set to benefit from eSIM technology?", available online at <https://web.archive.org/web/20211129210951/https://www.iot-now.com/2021/11/04/91229-set-benefit-esim-technology/>, Nov. 29, 2021, 10 pages.

* cited by examiner

*Primary Examiner* — Marcos L Torres
(74) *Attorney, Agent, or Firm* — KONRAD, RAYNES, DAVDA & VICTOR LLP; Rabindranath Dutta

(57) ABSTRACT

A determination is made via a computational device of an activity being performed by an entity in a virtual reality environment. An electronic subscriber identification module (eSIM) of a communications device of the entity is reconfigured in the virtual reality environment, in response to the determination of the activity being performed by the entity in the virtual reality environment.

15 Claims, 10 Drawing Sheets

500

First exemplary operations for dynamic configuration of an eSIM in a virtual reality environment

502

Determining, via a computational device, an activity being performed by an entity in a virtual reality environment.

504

Reconfiguring an electronic subscriber identification module (eSIM) of a communications device of the entity in the virtual reality environment, in response to the determining of the activity being performed by the entity in the virtual reality environment, wherein a configuration logic that reconfigures the eSIM is based on an interaction of the entity with virtual reality content provided to the entity in the virtual reality environment.

Figure 5:
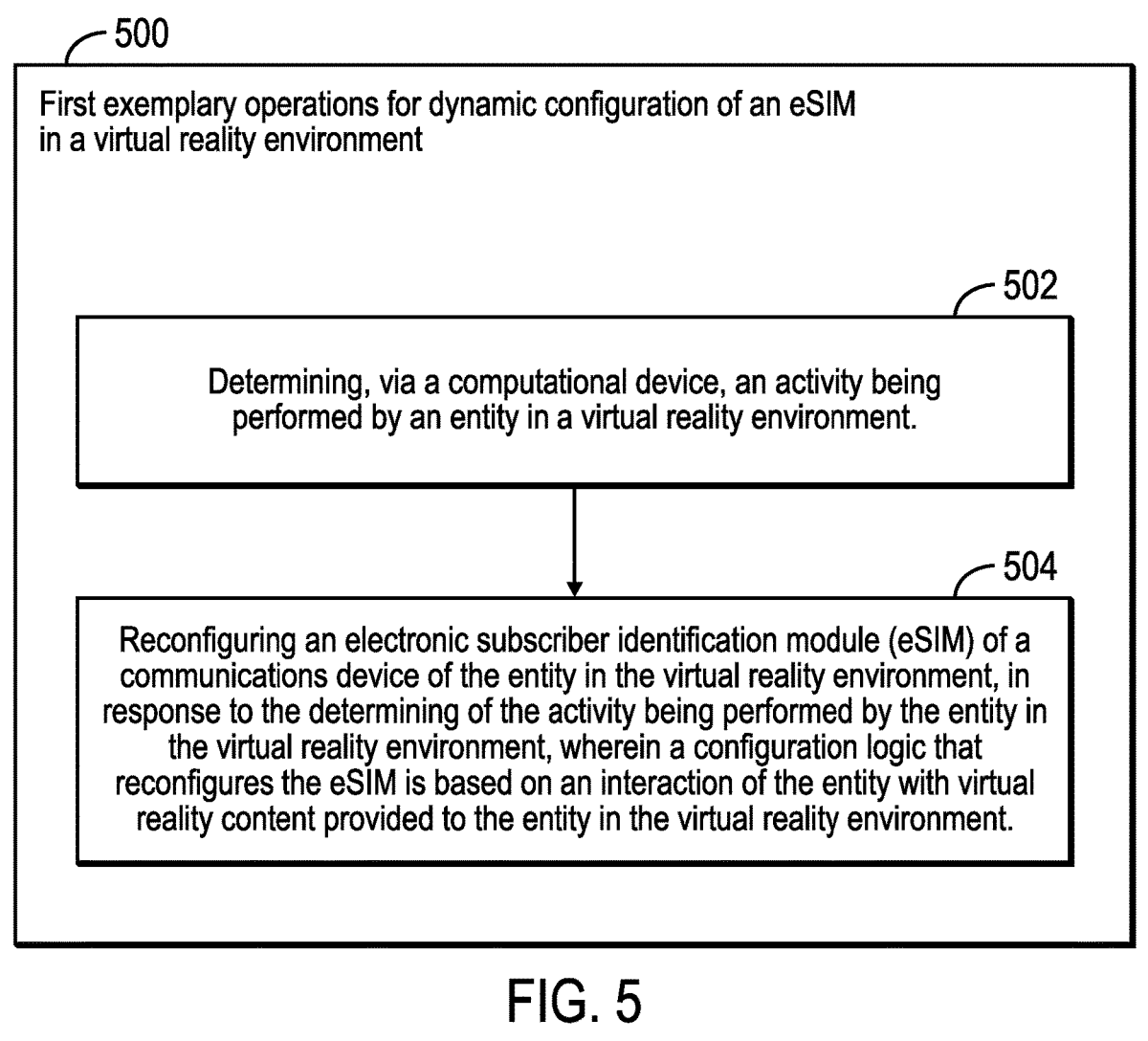

┌─ 500

┌──────────────────────────────────────────────────────────────┐
│ First exemplary operations for dynamic configuration of an eSIM │
│ in a virtual reality environment                                │
│                                                                  │
│                                          ┌─ 502                  │
│   ┌────────────────────────────────────────────────────┐       │
│   │                                                      │       │
│   │   Determining, via a computational device, an activity being │
│   │   performed by an entity in a virtual reality environment.   │
│   │                                                      │       │
│   └────────────────────────────────────────────────────┘       │
│                           │                                      │
│                           │                                      │
│                           ▼              ┌─ 504                  │
│   ┌────────────────────────────────────────────────────┐       │
│   │   Reconfiguring an electronic subscriber identification module (eSIM) of a │
│   │   communications device of the entity in the virtual reality environment, in │
│   │   response to the determining of the activity being performed by the entity in │
│   │   the virtual reality environment, wherein a configuration logic that │
│   │   reconfigures the eSIM is based on an interaction of the entity with virtual │
│   │   reality content provided to the entity in the virtual reality environment. │
│   └────────────────────────────────────────────────────┘       │
│                                                                  │
└──────────────────────────────────────────────────────────────┘

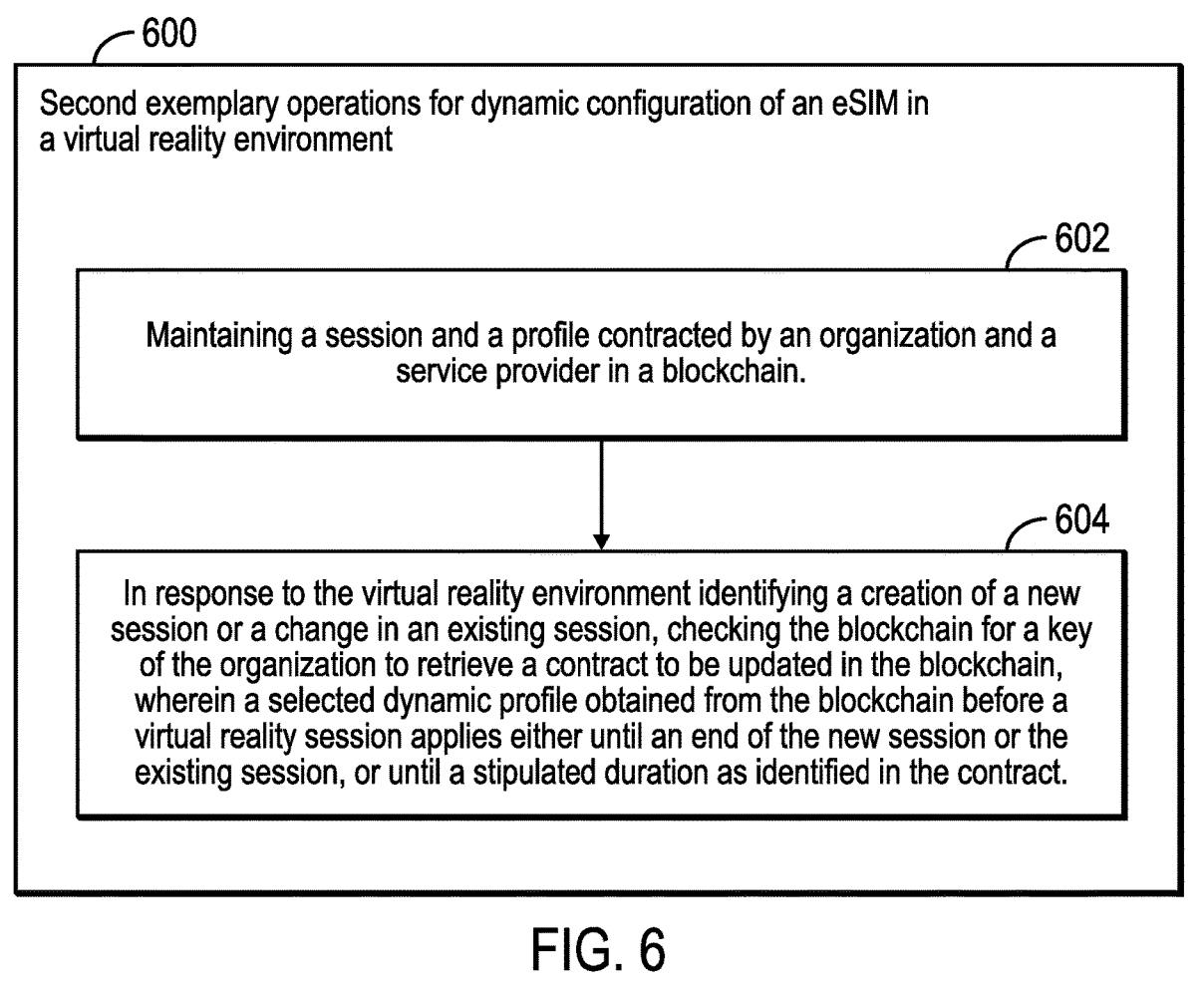

Second exemplary operations for dynamic configuration of an eSIM in a virtual reality environment

602

Maintaining a session and a profile contracted by an organization and a service provider in a blockchain.

604

In response to the virtual reality environment identifying a creation of a new session or a change in an existing session, checking the blockchain for a key of the organization to retrieve a contract to be updated in the blockchain, wherein a selected dynamic profile obtained from the blockchain before a virtual reality session applies either until an end of the new session or the existing session, or until a stipulated duration as identified in the contract.

FIG. 6

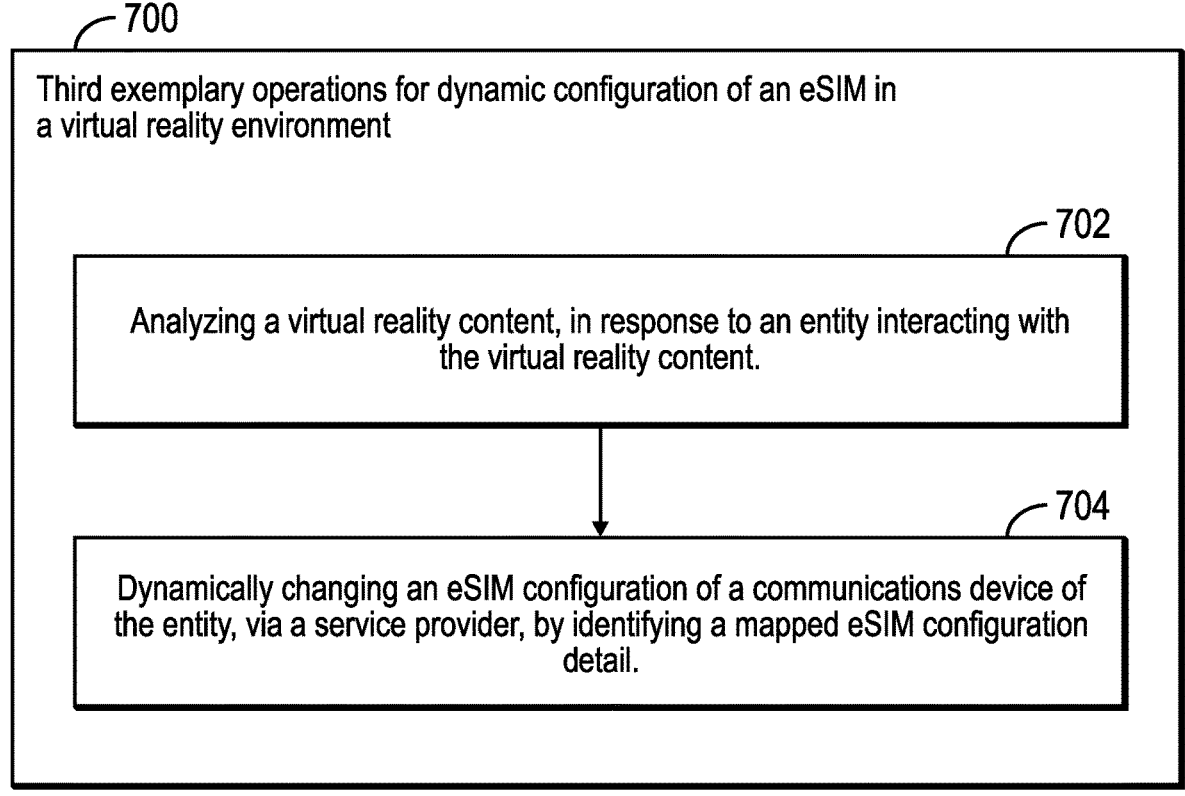

700

Third exemplary operations for dynamic configuration of an eSIM in a virtual reality environment

702

Analyzing a virtual reality content, in response to an entity interacting with the virtual reality content.

704

Dynamically changing an eSIM configuration of a communications device of the entity, via a service provider, by identifying a mapped eSIM configuration detail.

Fourth exemplary operations for dynamic configuration of an eSIM in a virtual reality environment

802

Capturing call data for a user.

804

Calculating an amount of time spent for the user based on an addition of the wireless device of the user to a new service plan.

900

Fifth exemplary operations for dynamic configuration of an eSIM in a virtual reality environment

902

Enabling a user to login into a plurality of virtual reality sessions simultaneously.

904

In response to a change in eye direction of the user, moving from one virtual reality session to another virtual reality session.

1300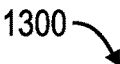

Computer 1301

Processor Set 1310

Processing Circuitry 1320    Cache 1321

Communication Fabric 1311

Volatile Memory 1312

Persistent Storage 1313

Operating System 1322 eSIM CONFIGURATION APPLICATION 1360

1350

Peripheral Device Set 1314

UI Device Set 1323    Storage 1324    IoT Sensor Set 1325

Network Module 1315

WAN 1302

End User Device 1303

Remote Server 1304

Remote Database 1330

Private Cloud 1306

Gateway 1340

Cloud Orchestration Module 1341

Virtual Machine Set 1343

Public Cloud 1305

Host Physical Machine Set 1342

Container Set 1344

FIG. 10

DYNAMIC CONFIGURATION OF AN ELECTRONIC SUBSCRIBER IDENTIFICATION MODULE IN A VIRTUAL REALITY ENVIRONMENT

BACKGROUND

1. Field

Embodiments relate to a method, system, and computer program product for the dynamic configuration of an electronic subscriber identification module (eSIM) in a virtual reality environment.

2. Background

A virtual reality device may perform many types of activities. A virtual reality device may be used for playing games, for multi-user collaboration, for remote activities, for software development, etc. The user does not have move to a physical site for performing the activities in a virtual reality environment. By using the virtual reality device, a user may be able to secure the entire working environment in the current physical surrounding of the user. As a result, a user may perform various activities from a remote location, and the user may secure the exact working environment in the virtual reality device.

A subscriber identification module (SIM) card is typically supplied by a wireless carrier and programmed with account information, such as the phone number and security keys, to identify and authenticate a wireless phone to the network of the wireless carrier. A SIM card is typically a physical card that may be placed and removed from a wireless phone.

An eSIM (electronic SIM) is an electronic, or embedded, SIM. The eSIM is a programmable chip that is connected physically to the motherboard of a wireless phone. The eSIM is able to perform all the functions of a removable SIM card. However, an eSIM cannot be physically removed without breaking open the wireless phone and removing the chip.

A blockchain is a distributed database or ledger that is shared among the nodes of a computer network. As a database, a blockchain stores information electronically in digital format. Blockchains maintain a secure and decentralized record of transactions and guarantees the fidelity and security of a record of data, without the need for a trusted third party.

SUMMARY OF THE PREFERRED EMBODIMENTS

Provided are a method, system, and computer program product in which a determination is made via a computational device of an activity being performed by an entity in a virtual reality environment. An electronic subscriber identification module (eSIM) of a communications device of the entity is reconfigured in the virtual reality environment, in response to the determination of the activity being performed by the entity in the virtual reality environment.

In additional embodiments, a configuration logic that reconfigures the eSIM is based on an interaction of the entity with virtual reality content provided to the entity in the virtual reality environment.

In yet additional embodiments, a session and a profile contracted by an organization and a service provider is maintained in a blockchain. In response to the virtual reality environment identifying a creation of a new session or a change in an existing session, the blockchain is checked for a key of the organization to retrieve a contract to be updated in the blockchain.

In further embodiments, a selection is made of a dynamic profile obtained from the blockchain before a virtual reality session, to apply either until an end of the new session or the existing session, or until a stipulated duration as identified in the contract.

In yet further embodiments, a virtual reality content is analyzed, in response to the entity interacting with the virtual reality content. An eSIM configuration of the communications device of the entity is dynamically changed, via a service provider, by identifying a mapped eSIM configuration detail.

In certain embodiments, the entity is a user of a virtual reality device, and a wireless device of the user is dynamically added to a new service plan based on the configuring of the eSIM, wherein the wireless device of the user comprises the communications device.

In further embodiments, call data is captured for the user, wherein an amount of time spent is calculated for the user based on an addition of the wireless device of the user to the new service plan.

In further embodiments, the user is enabled to login into a plurality of virtual reality sessions simultaneously, wherein in response to a change in eye direction of the user, the user is moved from one virtual reality session to another virtual reality session.

BRIEF DESCRIPTION OF THE DRAWINGS

Referring now to the drawings in which like reference numbers represent corresponding parts throughout:

FIG. 5 illustrates a flowchart that shows first exemplary operations for dynamic configuration of an eSIM in a virtual reality environment, in accordance with certain embodiments;

FIG. 6 illustrates a flowchart that shows second exemplary operations for dynamic configuration of an eSIM in a virtual reality environment, in accordance with certain embodiments;

FIG. 7 illustrates a flowchart that shows third exemplary operations for dynamic configuration of an eSIM in a virtual reality environment, in accordance with certain embodiments;

FIG. 10 illustrates a computing environment in which certain components of FIG. 1 may be implemented, in accordance with certain embodiments.

DETAILED DESCRIPTION

Figure 1:
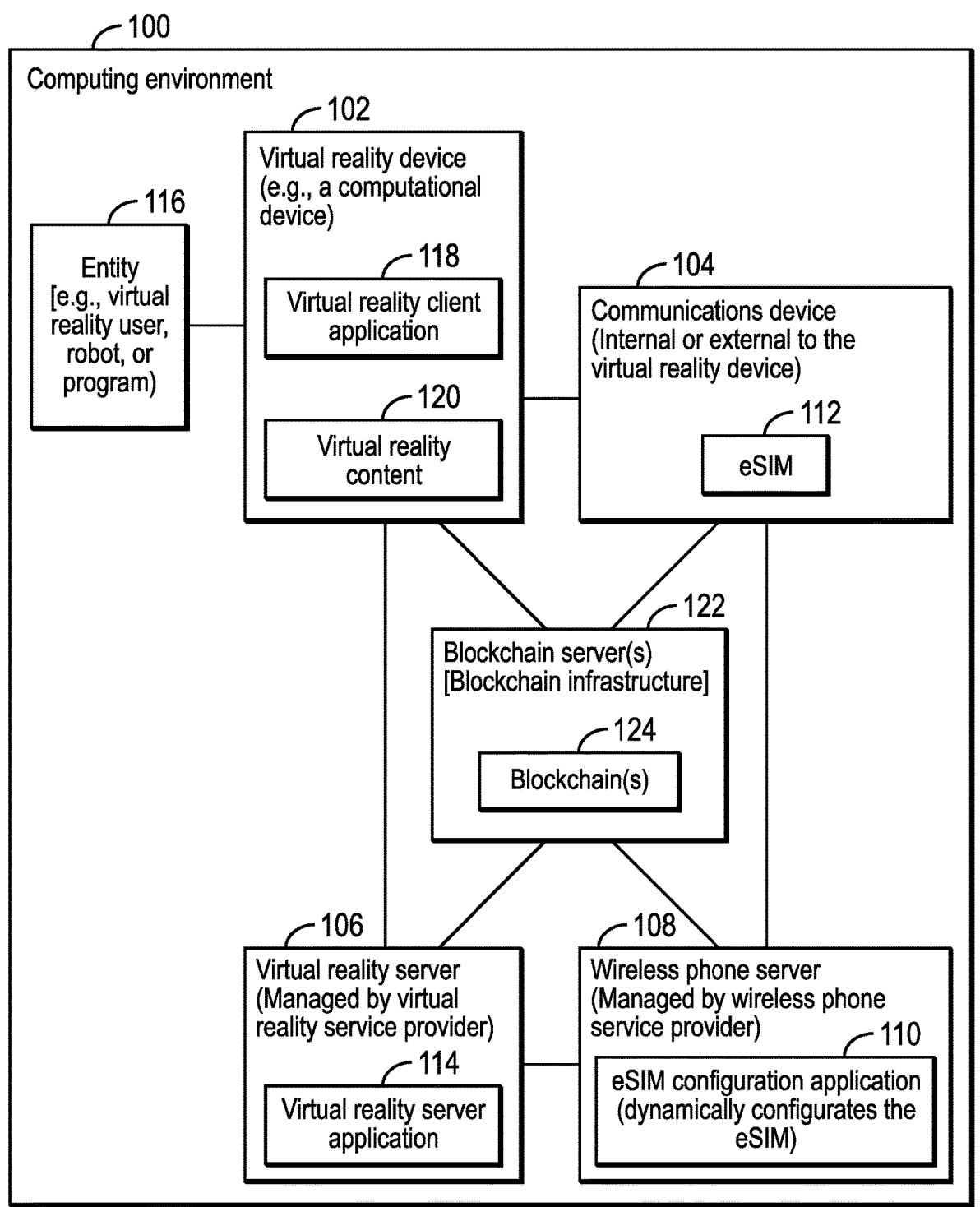
FIG. 1 illustrates a block diagram of a computing environment for a virtual reality device, in accordance with certain embodiments.

In the following description, reference is made to the accompanying drawings which form a part hereof and which illustrate several embodiments. It is understood that other embodiments may be utilized and structural and operational changes may be made.

It is time consuming to change wireless phone carriers with a physical SIM, as the existing SIM card may have to be replaced physically in the wireless phone. An eSIM makes the switching of wireless phone carriers easy, by allowing the entry of information from the wireless phone carrier into the wireless phone.

The technology for eSIM may be used not just in smartphones, but also in a range of consumer devices that require connectivity at all times. This includes wearables, such as smartwatches and smart glasses, connected home devices, and computing devices such as laptops and tablets. Technology that has traditionally been connected to Wi-Fi networks may benefit from the wider availability and security of 4G and 5G wireless networks.

An eSIM enables subscribers to connect more devices relatively easily to their wireless operator. Wireless operators may offer multi-device packages and bespoke data plans. With eSIM, device bundling may become much easier, as consumers are able to conveniently add new devices to their plans without having to physically go to a store or wait for a physical SIM card to arrive via mail.

In an Internet of Things (IoT) enabled surrounding, there may be different types of IoT devices, and different types of activities may be performed, and many activities may be combined. For example, IoT enabled helmets may be used by fire fighters, construction workers, mining workers or those working in machine shop floor, and different additional IoT enabled devices may be used for different activities.

In certain embodiments, by using a virtual reality device, a user can remotely perform different activities from remote locations, and the user may get the exact working environment. From time to time the user may change the work the user is performing. For example, at some point of time, user A works for Company X to fix an application defect, and at another time, the same user A works for Company Y to fix an application defect for another application. In this case both Company X and Y may have different plans for wireless service providers, and when the user A works for Company X, then one plan may be applied, and when the user works for company Y, then another plan may be applied.

Certain embodiments provide mechanisms for a dynamic switching of eSIM configuration for a user, such as user A. As the contract changes for different sessions (live streaming, cloud access, etc.), the profile contracted between the company and service provider may change based on the type of access and this profile may also change across companies. Hence, instead of the user monitoring or updating all these profiles, certain embodiments are used to provide automated mechanisms which can take this responsibility away from the user.

Certain embodiments provide mechanisms in which the virtual reality working environment of a user is identified, and based on the virtual reality activity of the user, certain embodiments may dynamically configure the eSIM of a wireless device of the user, so that an appropriate plan is applied based on the activity of the user in the virtual reality environment. The profile contracted may be fetched from a smart contract in a blockchain, by the virtual reality device of a user, based on the session. As a result, improvements are made to the operations of computing devices, such as virtual reality devices and other computing devices, in a computing environment.

Exemplary Embodiments

FIG. 1 illustrates a block diagram of a computing environment 100 for a virtual reality device 102, in accordance with certain embodiments. The virtual reality device 102 may comprise a computational device that is communicatively coupled to a communications device 104 such as a wireless device. In certain embodiments, the communications device 104 may be inside the virtual reality device 102, rather than outside the virtual reality device 102.

The virtual reality device 102 may be communicatively coupled to a virtual reality server 106 that is part of an infrastructure managed by a virtual reality service provider. The virtual reality server 106 may be communicatively coupled to a wireless phone server 108 managed by a wireless phone service provider. An eSIM configuration application 110 that executes in the wireless phone server 108 may be able to configure or reconfigure an eSIM 112 included in the communications device 104.

A virtual reality server application 114 may execute in the virtual reality server 106. An entity 116, such as a virtual reality user, a robot, or a program may interact with the virtual reality device 102, where a virtual reality client application 118 executes in the virtual reality device 102.

The virtual reality client application 118 may interact with the virtual reality server application 114 and as a result virtual reality content 120 may be made available to the entity 116. The entity 116 interacts with the virtual reality device 102.

In certain embodiments, the virtual reality device 102, the communications device 104, the virtual reality server 106, and the wireless phone server 108 may all be connected over a network to one or more blockchain servers 122 that store transactions in blockchains 124.

In certain embodiments, the virtual reality device 102, the communications device 104, the virtual reality server 106, and the wireless phone server 108, and the blockchain servers 122 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The virtual reality device 102, the communications device 104, the virtual reality server 106, and the wireless phone server 108, and the blockchain servers 122 may be elements in any suitable network, such as, a storage area network, a wide area network, the Internet, an intranet, etc. In certain embodiments, the virtual reality device 102, the communications device 104, the virtual reality server 106, and the wireless phone server 108, and the blockchain servers 122 may be elements in a cloud computing environment.

In certain embodiments, the virtual reality client application 118, the virtual reality server application 114, and the eSIM configuration application 110 may be implemented in software, hardware, firmware or any combination thereof.

Therefore, FIG. 1 illustrates a computing environment 100 in which a virtual reality server 106 may in association with the wireless phone server 108 configure or reconfigure the eSIM 112 of the communications device 104 of the virtual reality device 102. The configuration or reconfiguration of the eSIM 112 is based on the virtual reality content 120 that the entity 116 interacts with, where metadata for the configuration or reconfiguration of the eSIM is stored in the blockchains 124.

Figure 2:
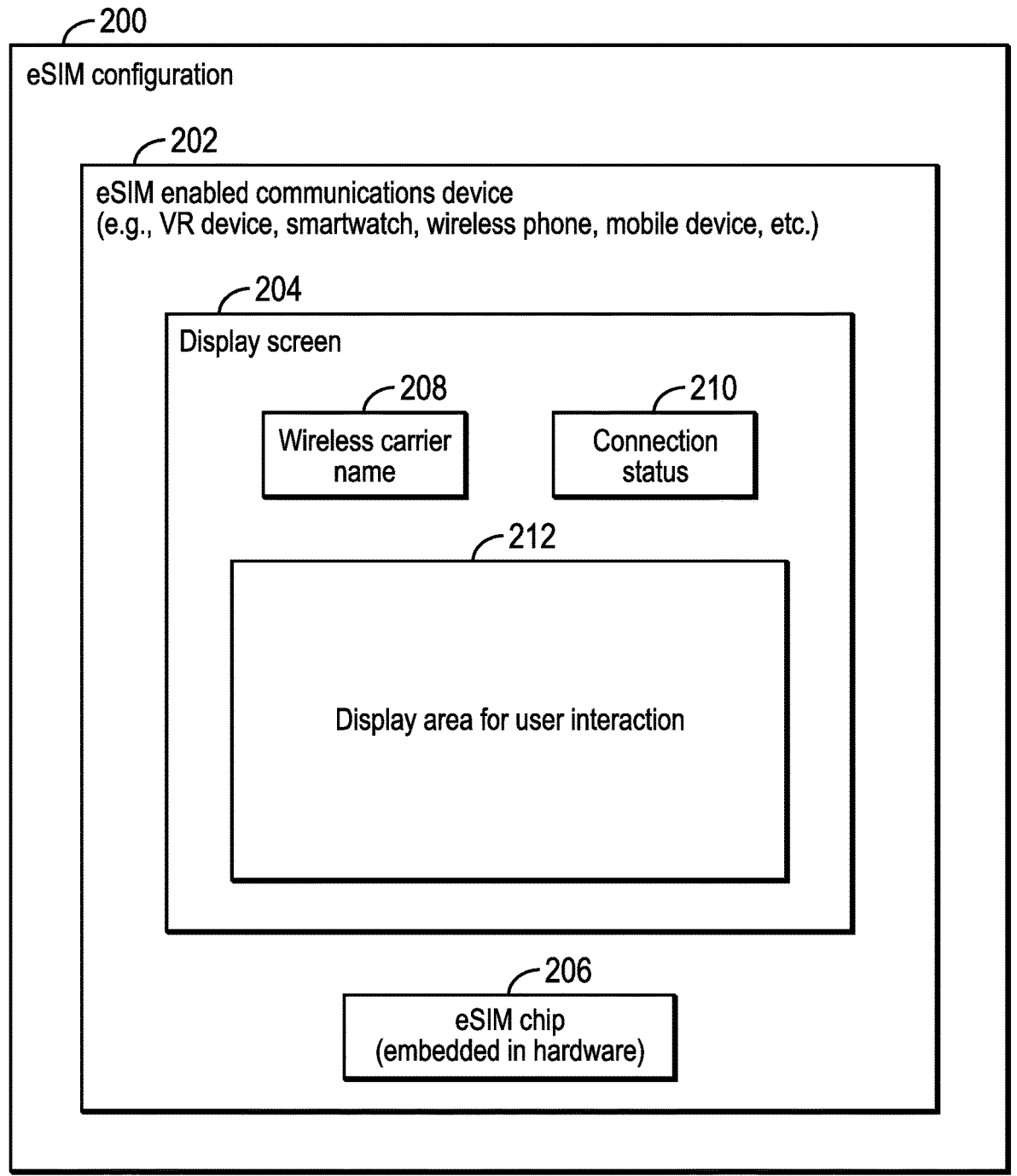
FIG. 2 illustrates a block diagram that shows an eSIM enabled communications device, in accordance with certain embodiments.

FIG. 2 illustrates a block diagram of eSIM configuration 200 and shows an eSIM enabled communications device 202, in accordance with certain embodiments. The eSIM enabled communications device may include a virtual reality (VR) device, a smartwatch, a wireless phone, etc. In certain embodiments, the eSIM enable communications device 202 may correspond the communications device 104 that was previously shown in FIG. 1.

The eSIM enabled communications device 202 may include a display screen 204 and an eSIM chip 206, where the eSIM chip 206 may be embedded in the hardware of the eSIM enabled communication device 202.

The display screen 204 may show the wireless carrier name 208 and the connection status 210 of the eSIM enabled communications device 202 to the wireless network supported by the wireless carrier. There may also be a display area 212 for user interaction.

Figure 3:
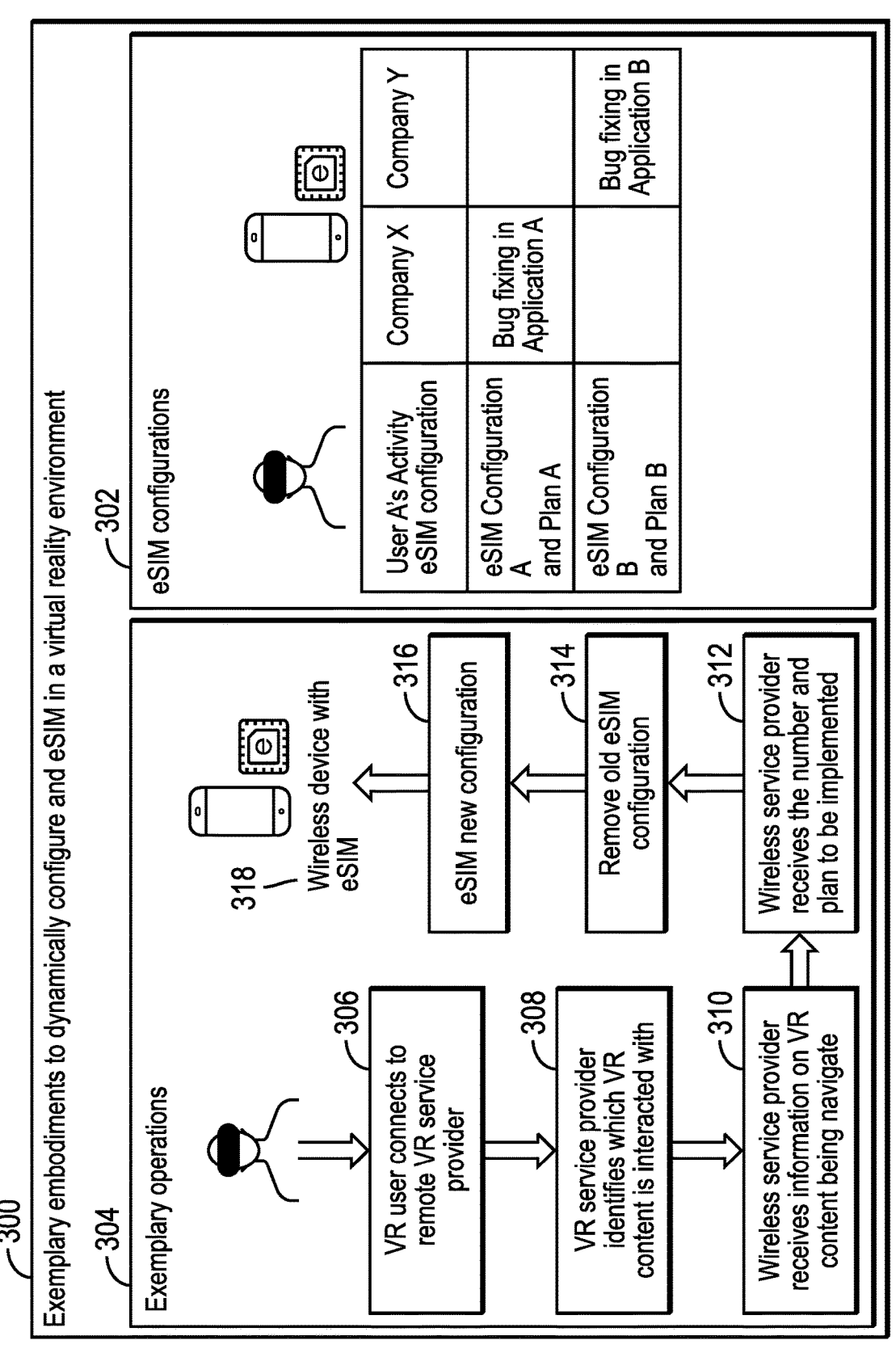
FIG. 3 illustrates a block diagram that shows exemplary embodiments to dynamically configure an eSIM in a virtual reality environment, in accordance with certain embodiments.

FIG. 3 illustrates a block diagram 300 that shows exemplary embodiments to dynamically configure an eSIM in a virtual reality environment, in accordance with certain embodiments.

In the block labeled 302, FIG. 3 shows that at some point of time, the user A is works for Company X to fix an application defect (referred to as "bug'), and in another point of time, user A works for Company Y to fix bug for another application. In this case both Company X and Y are having different plans for wireless service providers (also referred to as wireless service providers), and when the user A works for Company X then one plan may be applied, and when the user works for Company Y then another plan may be applied. Certain embodiments dynamically switch the eSIM configuration for user A to either plan A or plan B, where plan A may have a different bandwidth or data cap in comparison to plan B, and plan A is used for Company X and plan B is used for Company Y.

Exemplary operations 300 for eSIM configuration are also shown in FIG. 3. Control starts at block 306 in which a virtual reality user connects to a remote virtual reality service provider. The virtual reality service provider identifies (at block 308) which virtual reality content is interacted with. From block 308 control proceeds to block 310 in which the wireless service provider receives information on which virtual reality content is navigated to by the virtual reality user. The wireless service provider receives which number and plan is to be implemented (at block 312). The wireless service provider removes (at block 314) the old eSIM configuration and places (at block 316) the new eSIM configuration corresponding to the number and plan for the wireless device with eSIM 318.

Therefore, FIG. 3 illustrates certain embodiments in which a virtual reality service provider in association with a wireless service provider reconfigures the eSIM of a wireless device, based on the virtual reality content that a virtual reality user interacts with.

Figure 4:
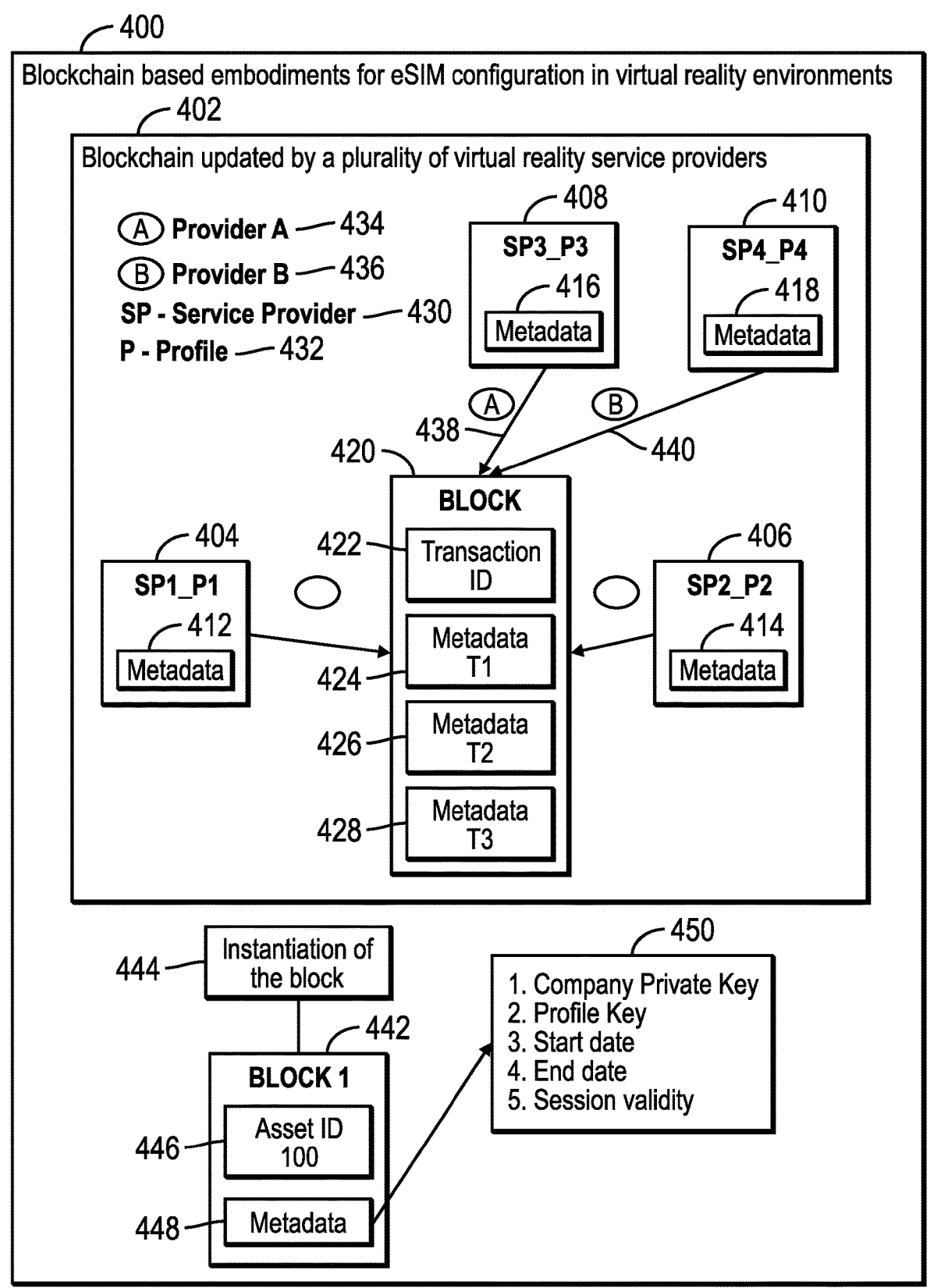
FIG. 4 illustrates a block diagram that shows blockchain based embodiments for eSIM configuration in a virtual reality environment, in accordance with certain embodiments.

FIG. 4 illustrates a block diagram 400 that shows blockchain based embodiments for eSIM configuration in a virtual reality environment, in accordance with certain embodiments.

The blockchain may be maintained as a service by a third party or may be maintained by any telecom regulatory organization. The key of the service provider and the profiles along with other details may be stored in the blockchain along with the associated contract negotiated between the company and the service provider so that the selection of profile and the service provider is agnostic to both the user and the virtual reality system.

In FIG. 4, a diagram 402 shows a blockchain updated by a plurality of virtual reality service providers. FIG. 4 shows a total of four virtual reality service providers 404, 406, 408, 410 with respective metadata 412, 414, 416, 418.

A block 420 is shown to be populated with a plurality of transaction identifiers 422 and a plurality of metadata transactions 424, 426, 428. Each of the virtual reality service providers may have a different profile. For example, the service provider 404 labeled SP1_P1 has a profile P1, and the service provider 408 labeled SP3_P3 has a profile P3 as shown via the legends 430, 432.

In FIG. 4, service provider A and service provider B shown by legends 434 and 436 are shown to update the block 420 via the arcs 438 and 440 respectively, where reference numeral 408 shows provider A via the label SP3_P3 and reference numeral 410 shows provider B via the label SP4_P4.

In FIG. 4, "Block 1" is an instantiation of the block 420 as shown via reference numerals 442, 444. An asset identifier 446 and metadata 448 may be included in the instantiation, where the metadata 448 may include the company private key, a profile key, a start data, an end data, and a session validity as shown via reference numeral 450.

In certain embodiments, the profiles may also be stored along with the contract signed between the company and service provider in blockchain so that the required profile for the current context is selected automatically by the virtual reality system. As an when the contract changes, the changes are added to the blockchain so that the dynamic changes are agnostic to both the user and the virtual reality system.

In certain embodiments, the session, the profile contracted by the company and the service provider are all maintained in blockchain so that whenever the virtual reality system identifies creation of a new session or a change in an existing session, the smart contract is checked for the company's key to retrieve the contracts which may be updated in blockchain as an when the contract changes. The dynamic profiles obtained from blockchain are selected before the virtual reality session starts and are applied either till the end of the session or till a stipulated duration as identified from the contract.

FIG. 5 illustrates a flowchart 500 that shows first exemplary operations for dynamic configuration of an eSIM in a virtual reality environment, in accordance with certain embodiments.

Control starts at block 502 in which a determination is made via a computational device of an activity being performed by an entity in a virtual reality environment. An electronic subscriber identification module (eSIM) of a communications device of the entity is reconfigured (at block 504) in the virtual reality environment, in response to the determination of the activity being performed by the entity in the virtual reality environment, wherein a configuration logic that reconfigures the eSIM is based on an interaction of the entity with virtual reality content provided to the entity in the virtual reality environment.

FIG. 6 illustrates a flowchart 600 that shows second exemplary operations for dynamic configuration of an eSIM in a virtual reality environment, in accordance with certain embodiments.

Control starts at block 602, in which a session and a profile contracted by an organization and a service provider are maintained in a blockchain. In response to the virtual reality environment identifying a creation of a new session or a change in an existing session, the blockchain is checked (at block 604) for a key of the organization to retrieve a contract to be updated in the blockchain, wherein a selection is made of a dynamic profile obtained from the blockchain before a virtual reality session, to apply either until an end of the new session or the existing session, or until a stipulated duration as identified in the contract.

FIG. 7 illustrates a flowchart 700 that shows third exemplary operations for dynamic configuration of an eSIM in a virtual reality environment, in accordance with certain embodiments.

Control starts at block 702 in which a virtual reality content is analyzed, in response to the entity interacting with the virtual reality content. An eSIM configuration of the communications device of the entity is dynamically changed (at block 704), via a service provider, by identifying a mapped eSIM configuration detail.

Figure 8:
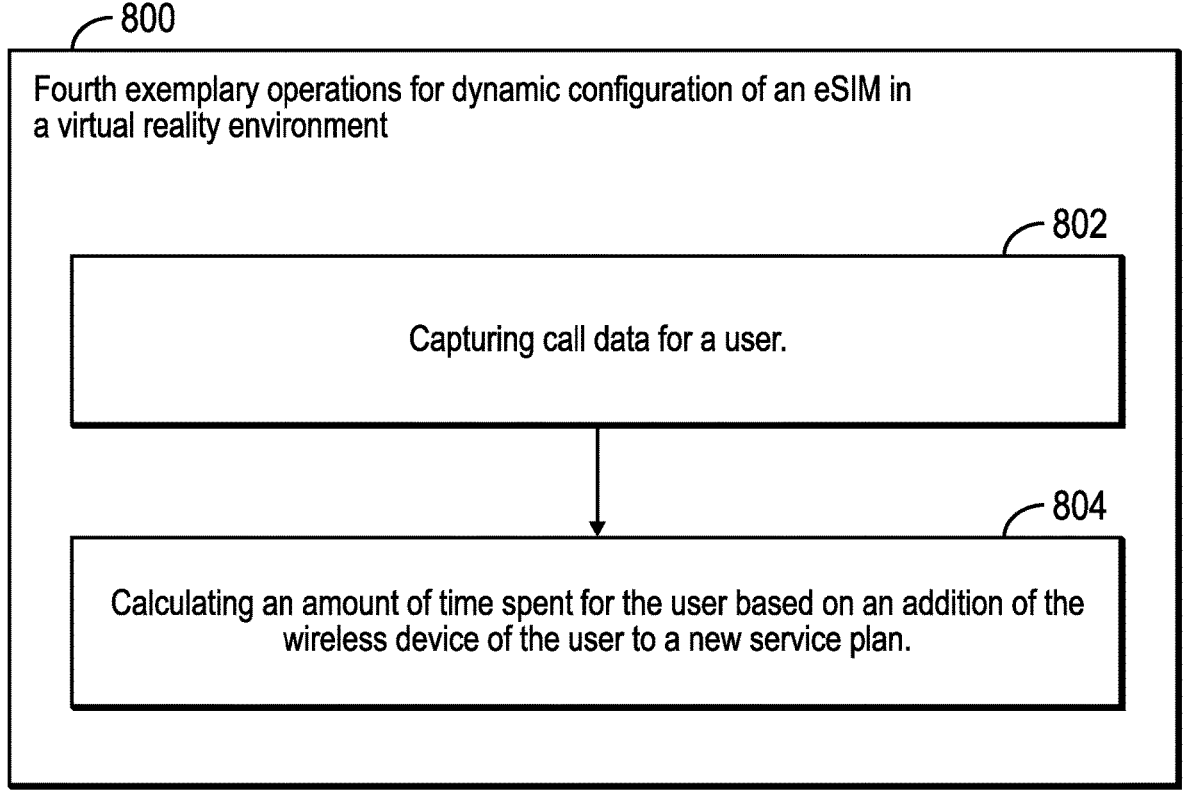
FIG. 8 illustrates a flowchart that shows fourth exemplary operations for dynamic configuration of an eSIM in a virtual reality environment, in accordance with certain embodiments.

FIG. 8 illustrates a flowchart 800 that shows fourth exemplary operations for dynamic configuration of an eSIM in a virtual reality environment, in accordance with certain embodiments.

Control starts at block 802 in which call data is captured for the user, wherein an amount of time spent is calculated (at block 804) for the user based on an addition of the wireless device of the user to the new service plan.

Figure 9:
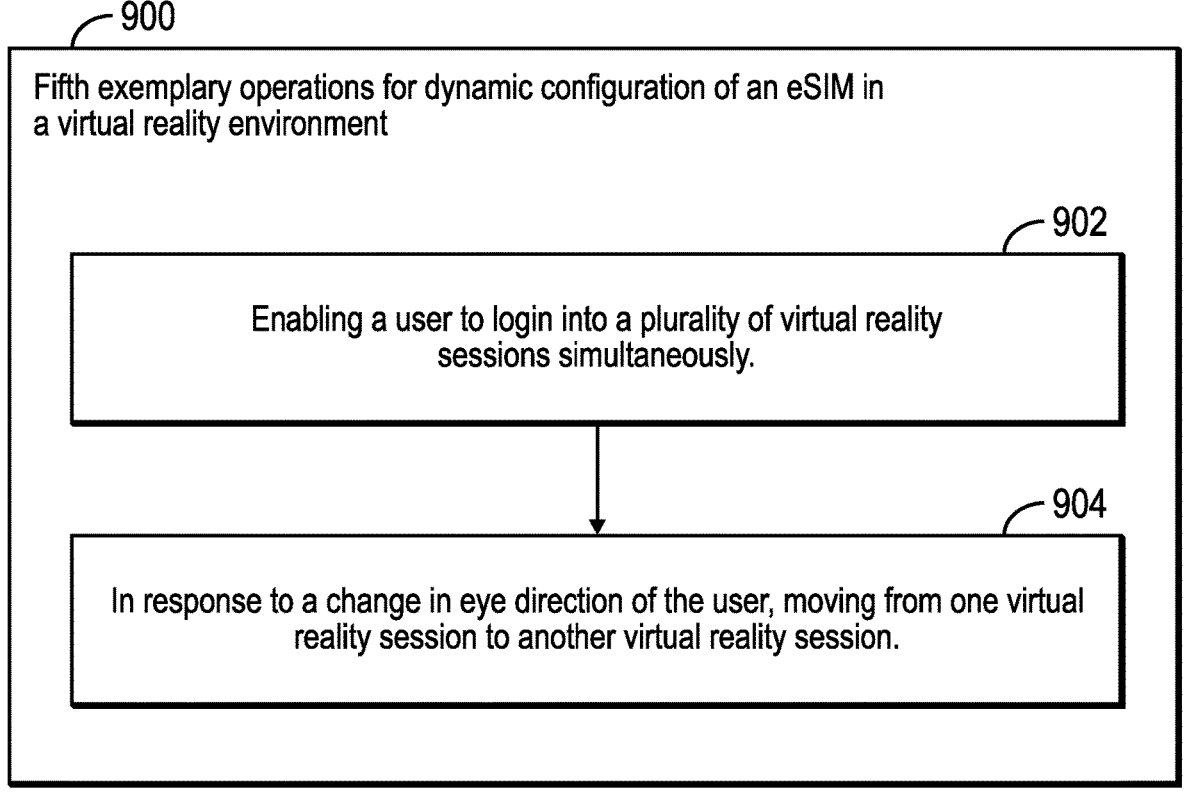
FIG. 9 illustrates a flowchart that shows fifth exemplary operations for dynamic configuration of an eSIM in a virtual reality environment, in accordance with certain embodiments.

FIG. 9 illustrates a flowchart 900 that shows fifth exemplary operations for dynamic configuration of an eSIM in a virtual reality environment, in accordance with certain embodiments.

The user is enabled (at block 902) to login into a plurality of virtual reality sessions simultaneously, wherein in response to a change in eye direction of the user, the user is moved (at block 904) from one virtual reality session to another virtual reality session.

Therefore, FIGS. 1-9 illustrate certain embodiments for configuring an eSIM dynamically in a virtual reality environment by using a blockchain.

Further Embodiments

In certain embodiments, based on the virtual reality content interaction, the eSIM may be configured dynamically, and accordingly the user may dynamically be connected to an appropriate group chatroom (like chat applications that are linked to a mobile number) so that while performing the activity in the virtual reality environment, the user can connect to appropriate group members who are also performing similar activity with their respective virtual reality environment.

In the same virtual reality session, the user can move one virtual reality content to another virtual reality content, and accordingly the eSIM may also be configured based on the change in the virtual reality content in the same virtual reality session. While the user interacts with the virtual reality content, a cloud hosted system may be analyzing the virtual reality content, and accordingly be identifying the mapped eSIM configuration detail, and the service provider may dynamically be changing the eSIM configuration. Based on the eSIM configuration of the user, certain embodiments may dynamically be adding a user's mobile to new plan, and accordingly call data may be captured for the user, and billing may be calculated, In certain embodiments, the wireless device of the user is connected to the virtual reality device of the user, so that the wireless device is able to determine what virtual reality content the user is navigating. While performing any activity with a virtual reality system, the user has to connect to appropriate virtual reality content source. In the virtual reality environment, the user may secure the entire working environment virtually and can perform the activity virtually.

When the user connects to a virtual reality content provider's server, then the remote virtual reality content provider may authorize the user and may allow the user to interact with the authorized content. In this case, the virtual reality content is linked to an activity that can be performed virtually.

In certain embodiments, a wireless device may be having interactions with the service provider, and the service provider may be gathering what content is being interacted with. The service provider can also gather information on the current session in the virtual reality environment and may identify which activity the user is performing.

In the remote wireless service provider's server, the eSIM configuration detail may be stored. Based on the identified activity in the virtual reality environment, certain embodiments may dynamically change the eSIM configuration.

During eSIM configuration, the remote service provider server can change the phone number with a different plan or can keep the same phone number with a different plan. The remote wireless service provider's server may gather the feed from the virtual reality cloud server, and may identify a user's current virtual reality session and activity.

The wireless service provider may control the configuration detail of the eSIM, and accordingly the eSIM may be configured. Based on the configuration of the eSIM, the user may be moved to different telephonic connectivity plan aligned with the virtual reality activity.

Using eye movement pattern, the user can move to one virtual reality session to another virtual reality session or in the same session move to different virtual reality contents. Based on the configuration of the eSIM, the user's wireless connectivity may be aligned with the virtual reality content.

Once the eSIM is configured, then the user may be connected to the new plan or new wireless number, and the same may be aligned with the virtual reality content. The embodiments may dynamically be adding the user's eSIM with a textual messaging group so that the user can perform textual interaction with other members who are performing the same activity in a group. When the eSIM is configured, and the appropriate data plan is provided with the eSIM, then the same data plan can be used for virtual reality content browsing.

Additional Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code (block 1350) involved in performing the inventive methods, such as the eSIM configuration application 1360 (The eSIM configuration application 1360 of FIG. 10 is shown via reference numeral 110 in FIG. 1).

In addition to block 1350, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1350, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 10. On the other hand, computer 1301 is not required to be in a cloud except to any extent as may be affirmatively indicated.

PROCESSOR SET 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in block 1350 in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface-type operating systems that employ a kernel. The code included in block 1350 typically includes at least some of the computer code involved in performing the inventive methods.

PERIPHERAL DEVICE SET 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

NETWORK MODULE 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on.

REMOTE SERVER 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method comprising:
determining, via a computational device, an activity being performed by a user of a virtual reality environment;
reconfiguring an electronic subscriber identification module (eSIM) of a wireless device of the user in the virtual reality environment, in response to the determining of the activity being performed by the user in the virtual reality environment;
dynamically adding the wireless device of the user to a new service plan based on the reconfiguring of the eSIM;
capturing call data for the user, and calculating an amount of time spent for the user based on the adding of the wireless device of the user to the new service plan;
enabling the user to login into a plurality of virtual reality sessions simultaneously;
determining a change in an eye direction of the user; and
in response to the change in the eye direction of the user, moving from one virtual reality session to another virtual reality session.

2. The method of claim 1, wherein a configuration logic that reconfigures the eSIM is based on an interaction of the user with virtual reality content provided to the user in the virtual reality environment.

3. The method of claim 1, the method further comprising:
maintaining a session and a profile contracted by an organization and a service provider in a blockchain; and
in response to the virtual reality environment identifying a creation of a new session or a change in an existing session, checking the blockchain for a key of the organization to retrieve a contract to be updated in the blockchain.

4. The method of claim 3, the method further comprising:
selecting a dynamic profile obtained from the blockchain before a virtual reality session to apply either until an end of the new session or the existing session, or until a stipulated duration as identified in the contract.

5. The method of claim 1, the method further comprising:
analyzing a virtual reality content, in response to the user interacting with the virtual reality content; and
dynamically changing an eSIM configuration of the wireless device of the user, via a service provider, by identifying a mapped eSIM configuration detail.

6. A system, comprising:
a memory; and
a processor coupled to the memory, wherein the processor performs operations, the operations comprising:
determining an activity being performed by a user of a virtual reality environment;
reconfiguring an electronic subscriber identification module (eSIM) of a wireless device of the user in the virtual reality environment, in response to the determining of the activity being performed by the user in the virtual reality environment;

dynamically adding the wireless device of the user to a new service plan based on the reconfiguring of the eSIM;

capturing call data for the user, and calculating an amount of time spent for the user based on the adding of the wireless device of the user to the new service plan;

enabling the user to login into a plurality of virtual reality sessions simultaneously;

determining a change in an eye direction of the user; and in response to the change in the eye direction of the user, moving from one virtual reality session to another virtual reality session.

7. The system of claim 6, wherein a configuration logic that reconfigures the eSIM is based on an interaction of the user with virtual reality content provided to the user in the virtual reality environment.

8. The system of claim 6, the operations further comprising:

maintaining a session and a profile contracted by an organization and a service provider in a blockchain; and in response to the virtual reality environment identifying a creation of a new session or a change in an existing session, checking the blockchain for a key of the organization to retrieve a contract to be updated in the blockchain.

9. The system of claim 8, the operations further comprising:

selecting a dynamic profile obtained from the blockchain before a virtual reality session to apply either until an end of the new session or the existing session, or until a stipulated duration as identified in the contract.

10. The system of claim 6, the operations further comprising:

analyzing a virtual reality content, in response to the user interacting with the virtual reality content; and dynamically changing an eSIM configuration of the wireless device of the user, via a service provider, by identifying a mapped eSIM configuration detail.

11. A computer program product, the computer program product comprising a computer readable storage medium having computer readable program code embodied therewith, the computer readable program code when executed by a computational device is configured to perform operations, the operations comprising:

determining an activity being performed by a user of a virtual reality environment;

reconfiguring an electronic subscriber identification module (eSIM) of a wireless device of the user in the virtual reality environment, in response to the determining of the activity being performed by the user in the virtual reality environment;

dynamically adding the wireless device of the user to a new service plan based on the reconfiguring of the eSIM;

capturing call data for the user, and calculating an amount of time spent for the user based on the adding of the wireless device of the user to the new service plan;

enabling the user to login into a plurality of virtual reality sessions simultaneously;

determining a change in an eye direction of the user; and in response to the change in the eye direction of the user, moving from one virtual reality session to another virtual reality session.

12. The computer program product of claim 11, wherein a configuration logic that reconfigures the eSIM is based on an interaction of the user with virtual reality content provided to the user in the virtual reality environment.

13. The computer program product of claim 11, the operations further comprising:

maintaining a session and a profile contracted by an organization and a service provider in a blockchain; and in response to the virtual reality environment identifying a creation of a new session or a change in an existing session, checking the blockchain for a key of the organization to retrieve a contract to be updated in the blockchain.

14. The computer program product of claim 13, the operations further comprising:

selecting a dynamic profile obtained from the blockchain before a virtual reality session to apply either until an end of the new session or the existing session, or until a stipulated duration as identified in the contract.

15. The computer program product of claim 11, the operations further comprising:

analyzing a virtual reality content, in response to the user interacting with the virtual reality content; and dynamically changing an eSIM configuration of the wireless device of the user, via a service provider, by identifying a mapped eSIM configuration detail.

* * * * *